US010863446B2

(12) United States Patent
Furuichi

(10) Patent No.: US 10,863,446 B2
(45) Date of Patent: Dec. 8, 2020

(54) COMMUNICATION CONTROL DEVICE AND COMMUNICATION CONTROL METHOD

(71) Applicant: SONY CORPORATION, Tokyo (JP)

(72) Inventor: Sho Furuichi, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/336,232

(22) PCT Filed: Sep. 28, 2017

(86) PCT No.: PCT/JP2017/035342
§ 371 (c)(1),
(2) Date: Mar. 25, 2019

(87) PCT Pub. No.: WO2018/074177
PCT Pub. Date: Apr. 26, 2018

(65) Prior Publication Data
US 2019/0261282 A1 Aug. 22, 2019

(30) Foreign Application Priority Data
Oct. 20, 2016 (JP) ................. 2016-206026

(51) Int. Cl.
H04W 52/24 (2009.01)
H04W 16/14 (2009.01)
(Continued)

(52) U.S. Cl.
CPC ......... H04W 52/241 (2013.01); H04W 16/14 (2013.01); H04W 52/243 (2013.01);
(Continued)

(58) Field of Classification Search
CPC ............. H04W 52/243; H04W 52/244; H04W 52/283; H04W 16/14; H04W 52/00–60
See application file for complete search history.

(56) References Cited

U.S. PATENT DOCUMENTS 8,660,498 B2 * 2/2014 Gurney ............... H04W 52/367
455/67.11
9,002,289 B2 4/2015 Muraoka et al.
(Continued)

FOREIGN PATENT DOCUMENTS

CA 2766410 A1 1/2011
CN 105453628 A 3/2016
(Continued)

OTHER PUBLICATIONS

"Aggregate interference with FCC and ECC white space usage rules: case study in Findland", IEEE International Symposium on Dynamic Spectrum Access Networks (DySPAN), Jantti et al. (Year: 2011).*
(Continued)

Primary Examiner — Raymond S Dean
(74) Attorney, Agent, or Firm — Chip Law Group

(57) ABSTRACT

Provided is a communication control device including a height difference calculation unit that calculates a difference between an altitude of a reference point for calculating interference power including information regarding a height in a first wireless system and an altitude of one wireless communication device in a second wireless system including a plurality of wireless communication devices sharing a frequency allocated to the first wireless system. The communication control device further includes a power calculation unit that determines maximum allowable transmission power of the second wireless system so that an aggregate interference level due to communication of an interference source that can occur at the reference point satisfies an allowable interference level of the first wireless system, using one or more of the wireless communication devices for which the difference is less than a predetermined value as the interference source.

9 Claims, 8 Drawing Sheets

(51) Int. Cl.
*H04W 52/36* (2009.01)
*H04W 52/28* (2009.01)
*H04W 52/06* (2009.01)
*H04W 52/38* (2009.01)

(52) U.S. Cl.
CPC ....... *H04W 52/283* (2013.01); *H04W 52/365* (2013.01); *H04W 52/06* (2013.01); *H04W 52/386* (2013.01)

(56) References Cited

U.S. PATENT DOCUMENTS

| | | |
|---|---|---|
| 9,055,538 B2 | 6/2015 | Yamazaki et al. |
| 2010/0330919 A1 | 12/2010 | Gurney et al. |
| 2015/0119014 A1 | 4/2015 | Muraoka et al. |
| 2016/0128000 A1 | 5/2016 | Furuichi et al. |
| 2017/0013474 A1 | 1/2017 | Ando et al. |
| 2018/0270764 A1 | 9/2018 | Furuichi et al. |

FOREIGN PATENT DOCUMENTS

| | | |
|---|---|---|
| EP | 2449831 A2 | 5/2012 |
| EP | 3038400 A1 | 6/2016 |
| EP | 3133855 A1 | 2/2017 |
| JP | 5679033 B2 | 3/2015 |
| JP | 6361661 B2 | 7/2018 |
| MX | 357526 B | 7/2018 |
| RU | 2016104835 A | 8/2017 |
| TW | 201509202 A | 3/2015 |
| WO | 2011/008424 A2 | 1/2011 |
| WO | 2013/161281 A1 | 10/2013 |
| WO | 2015/025605 A1 | 2/2015 |
| WO | 2015/159411 A1 | 10/2015 |

OTHER PUBLICATIONS

Jantii, et al., "Aggregate Interference with FCC and ECC White Space Usage Rules: Case Study in Finland", IEEE International Symposium on Dynamic Spectrum Access Networks (DySPAN), Jun. 30, 2011, 04 pages.

"Technical and Operational Requirements for the Possible Operation of Cognitive Radio Systems in the 'White Spaces' of the Frequency Band 470-790 Mhz", Electronic Communications Committee Report(ECC), ECCREP159, Jan. 2011, 160 pages.

Extended European Search Report of EP Application No. 17862831.9, dated Sep. 20, 2019, 11 pages.

Toshifumi, et al., "An Efficient Zone Design for WIPAS using Vertical Service Area Division Method", Proceedings of the Society Conference of IEICE, Sep. 1, 2009, p. 467.

Miyagi, et al., "An Efficient Zone Design for WIPAS using Vertical Service Area Division Method", Proceedings of the Society Conference of IEICE 2009, vol. 1, Sep. 18, 2009, p. 467.

International Search Report and Written Opinion of PCT Application No. PCT/JP2017/035342, dated Dec. 19, 2017, 10 pages of ISRWO.

Miyagi, Toshifumi, "An Efficient Zone Design for WIPAS using Vertical Service Area Division Method," p. 467, Proceedings of the 2009 IEICE Communications Society Conference, Sep. 2009.

Search Report of SG Application No. 11201901920U, dated May 9, 2020, 09 pages.

Jantti, et al., "Aggregate interference with FCC and ECC white space usage rules: Case study in Finland", IEEE International Symposium on Dynamic Spectrum Access Networks (DySPAN), May 3-6, 2011, pp. 599-602.

\* cited by examiner

FIG. 10

| h1 | h2 | h3 | h4 | h5 |
|----|----|----|----|----|
| h6 | h7 | h8 | h9 | h10 |
| ... |  |  |  |  |
|  | ... |  |  |  |
|  |  | ... |  |  |
|  |  |  | ... | hx |

FIG. 11

| h1 | h2 | h3 | h4 | h5 |
|----|----|----|----|----|
| h6 | h7 | h8 | h9 | h10 |
| ... | REFERENCE POINT |  | r11 |  |
|  | ... | WSD |  |  |
|  | r12 | ... |  |  |
|  |  |  | ... | hx |

COMMUNICATION CONTROL DEVICE AND COMMUNICATION CONTROL METHOD

CROSS REFERENCE TO RELATED APPLICATIONS

This application is a U.S. National Phase of International Patent Application No. PCT/JP2017/035342 filed on Sep. 28, 2017, which claims priority benefit of Japanese Patent Application No. JP 2016-206026 filed in the Japan Patent Office on Oct. 20, 2016. Each of the above-referenced applications is hereby incorporated herein by reference in its entirety.

TECHNICAL FIELD

The present disclosure relates to a communication control device, a communication control method, and a computer program.

BACKGROUND ART

In recent years, various kinds of wireless systems such as a cellular network, a wireless local area network (LAN), a TV broadcasting system, a satellite communication system, and program making special events (PMSE) are in widespread use. To allow each wireless system to normally operate, it is desirable that frequency resources to be utilized are managed so that interference does not occur among the wireless systems. This is also similarly desirable among local networks included in one wireless system.

Regarding management of frequency resources, as one measure for alleviating depletion of frequency resources in the future, frequency sharing is studied. For example, a mechanism for causing a frequency channel allocated to one wireless system to be temporarily utilized by another wireless system is studied. There is a case where such a mechanism is also referred to as frequency secondary utilization. In general, a system to which a frequency channel has been allocated by priority is called a primary system, and a system that secondarily utilizes the frequency channel is called a secondary system.

A number of technologies for appropriately managing frequency resources have been developed. For example, the following Patent Literature 1 discloses a technology of suppressing a case where communication by base stations becomes a cause of interference by frequencies being allocated in accordance with locations of the base stations.

CITATION LIST

Patent Literature

Patent Literature 1: JP 5679033B

DISCLOSURE OF INVENTION

Technical Problem

In Electronic Communication Commission (ECC) Report 186 which was issued in 2013 by the European Conference of Postal and Telecommunications Administrations (CEPT) and has legislated guidelines of TV White Space (TVWS) systems utilizing the geographic unused frequency band of a TV broadcast frequency band, as one of the guidelines, a method of calculating maximum allowable transmission power of a secondary system is regulated in order to protect a primary system against harmful aggregate interference. However, depending on a configuration of the secondary system, appropriate maximum allowable transmission power may not be calculated in the method regulated in ECC Report 186 in some cases.

Accordingly, the present disclosure proposes a novel and improved communication control device, communication control method, and computer program capable of calculating maximum allowable transmission power appropriately and with a small calculation load.

Solution to Problem

According to the present disclosure, there is provided a communication control device including: a height difference calculation unit configured to calculate a difference between an altitude of a reference point for calculating interference power including information regarding a height in a first wireless system and an altitude of one wireless communication device in a second wireless system including a plurality of wireless communication devices sharing a frequency allocated to the first wireless system; and a power calculation unit configured to decide maximum allowable transmission power of the second wireless system so that an aggregate interference level due to communication of an interference source that can occur at the reference point satisfies an allowable interference level of the first wireless system, using one or more of the wireless communication devices for which the difference is less than a predetermined value as the interference source.

In addition, according to the present disclosure, there is provided a communication control method including: calculating a difference between an altitude of a reference point for calculating interference power including information regarding a height in a first wireless system and an altitude of one wireless communication device in a second wireless system including a plurality of wireless communication devices sharing a frequency allocated to the first wireless system; and deciding maximum allowable transmission power of the second wireless system so that an aggregate interference level due to communication of an interference source that can occur at the reference point satisfies an allowable interference level of the first wireless system, using one or more of the wireless communication devices for which the difference is less than a predetermined value as the interference source.

In addition, according to the present disclosure, there is provided a computer program causing a computer to perform: calculating a difference between an altitude of a reference point for calculating interference power including information regarding a height in a first wireless system and an altitude of one wireless communication device in a second wireless system including a plurality of wireless communication devices sharing a frequency allocated to the first wireless system; and deciding maximum allowable transmission power of the second wireless system so that an aggregate interference level due to communication of an interference source that can occur at the reference point satisfies an allowable interference level of the first wireless system, using one or more of the wireless communication devices for which the difference is less than a predetermined value as the interference source.

Advantageous Effects of Invention

According to the present disclosure, as described above, it is possible to provide a novel and improved communication control device, communication control method, and computer program capable of calculating maximum allowable transmission power appropriately and with a small calculation load.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 10 is an explanatory diagram illustrating a setting example of height information in each division in a divided map.

FIG. 11 is an explanatory diagram illustrating an example of a method of comparing heights of the WSD and the reference points.

MODE(S) FOR CARRYING OUT THE INVENTION

Figure 1:
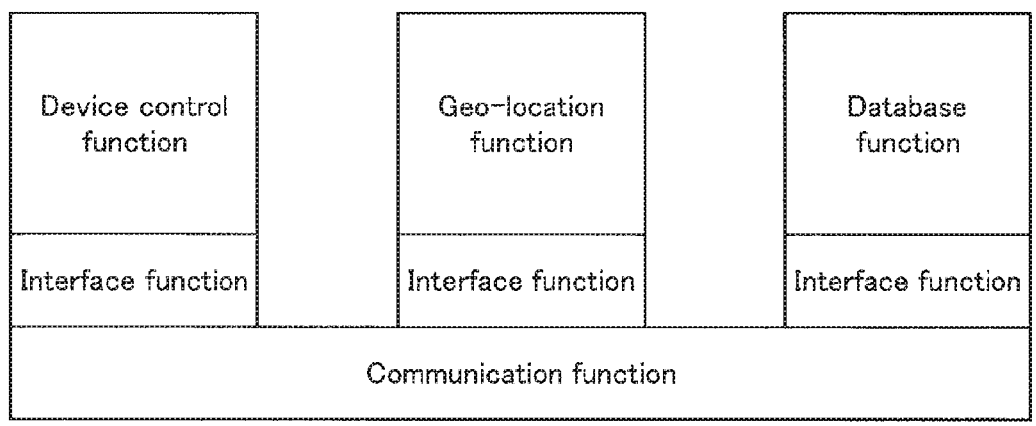
FIG. 1 is an explanatory diagram illustrating a logical architecture assumed according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be made in the following order.
1. Embodiment of present disclosure
1.1. Overview
1.2. System model example
1.3. Configuration example
1.4. Operation example
2. Conclusion

1. EMBODIMENT OF PRESENT DISCLOSURE

[1.1. Overview]

Before an embodiment of the present disclosure is described in detail, an overview of the embodiment of the present disclosure will be described.

In order to protect a primary system, ECC Report 186 regulates three kinds of interference margin setting methods of calculating maximum allowable transmission power of a secondary system. The three kinds of interference margin setting methods are a fixed/predetermined margin method, a flexible margin method, and a flexible minimized margin method.

An object of all three kinds of interference margin methods is to distribute an allowable given interference amount to a plurality of wireless communication devices so that an allowable interference amount is satisfied.

In addition, as one of the guidelines, ECC Report 186 regulates a method of calculating maximum allowable transmission power of a secondary system in order to protect a primary system against harmful aggregate interference. ECC Report 186 shows the validity of this through a computer simulation. In this simulation, however, it is assumed that only a master WSD operates, and thus calculation in consideration of slave WSDs that are connected to the master WSD to perform communication is not performed. In accordance with a calculation method regulated in ECC Report 186, it is easy to perform calculation in consideration of the slave WSDs. However, when the slave WSDs are considered, it is conceived that the following event occurs.

In a case in which a fixed margin method is used, consideration of all the slave WSDs causes a wider interference margin than necessary to be calculated, and thus there is concern of transmission power for allowing all of the master WSD and the slave WSDs considerably deteriorating.

In a case in which a flexible margin method is used, there is concern of transmission power for allowing all of the master WSD and the slave WSDs considerably deteriorating as in the case of the fixed margin method even if the transmission power does not deteriorate as much as with the fixed margin method.

In the case in which a flexible minimized margin method is used, an excess margin occurring in the fixed margin method or the flexible margin method is suppressed and calculation is originally performed so that transmission power allowed for the WSDs is the maximum. In contrast, a calculation amount is very large. In addition, when calculation is performed considering not only the master WSD but also the slave WSDs, there is concern of the calculation load increasing to an extent that is not ignorable.

In addition, in the above-described calculation method, positional information of the slave WSDs is assumed to be fixed. In practice, however, not only is it conceived that the slave WSDs move, but an operation mode in which positional information regarding the slave WSDs is not required to be acquired is regulated in ETSI EN 301 598. It is practically difficult to calculate maximum allowable transmission power in consideration of the slave WSD operating in that operation mode.

Accordingly, it is necessary to provide a simple maximum allowable transmission power calculation method in which a calculation load is small and positional information regarding slave WSDs is not necessary on the premise that there are slave WSDs capable of operating in the operation mode in which the position information is not required to be acquired.

Thus, in view of the above description, the authors of the present disclosure have thoroughly examined a simple maximum allowable transmission power calculation method in which a calculation load is small and positional information regarding slave WSDs is not necessary. As a result, as will be described below, the authors of the present disclosure have devised a technology for calculating maximum allowable transmission power simply and with a small calculation load by determining whether a WSD is an interference source on the basis of information regarding the WSD and calculating the maximum allowable transmission power on the basis of the determination result.

The overview of the embodiment of the present disclosure has been described above. Next, an embodiment of the present disclosure will be described in detail.

[1.2. System Model Example]

First, a system model of the embodiment of the present disclosure will be described. A logical architecture assumed in the embodiment of the present disclosure will be described first.

FIG. 1 is an explanatory diagram illustrating a logical architecture assumed according to an embodiment of the present disclosure. Each function in FIG. 1 will be described.

A database function is a logical entity that maintains information regarding communication devices of a secondary system, information regarding a primary business system (primary system), and the like and performs information management of the communication devices of the secondary system.

A geo-location function is a logical entity that performs calculation of operation parameters which are recommended for the communication devices of the secondary system and are required to be obeyed using information regarding positions of the communication devices of the secondary system.

A device control function is a logical entity that performs conversion to mutually understand a message which is notified of by the database function or the geo-location function or a message of which the database function or the geo-location function is notified by a communication device of the secondary system, or performs a change or the like of operation parameters of the communication device of the secondary system.

An interface function is a logical entity equivalent to a communication unit of each logical entity. In addition, the communication function is an entity equivalent to a communication path between the logical entities.

The logical architecture assumed in the embodiment of the present disclosure has been described above. Next, a mounting example based on the logical architecture that has such a configuration will be described.

Figure 2:
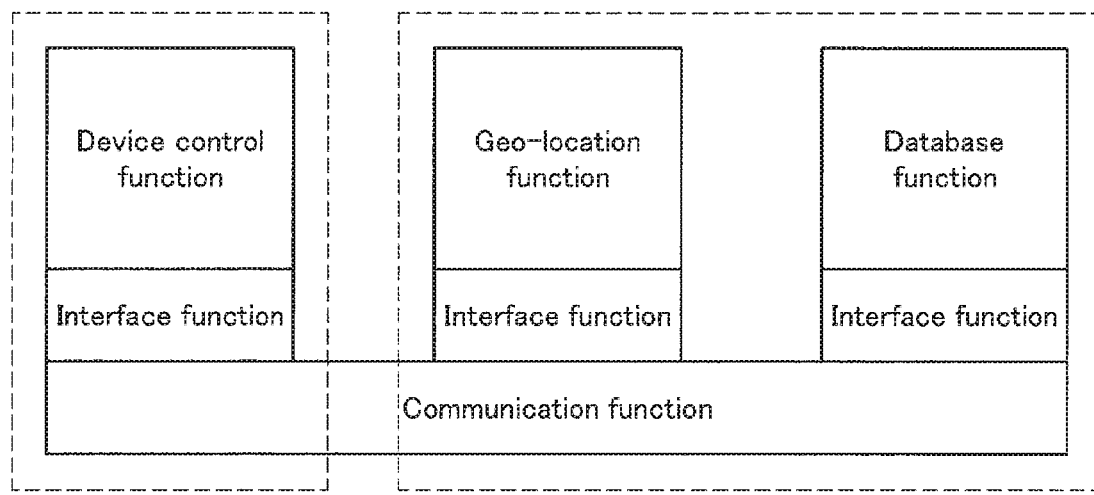
FIG. 2 is an explanatory diagram illustrating a mounting example based on the logical architecture illustrated in FIG. 1.

FIG. 2 is an explanatory diagram illustrating a mounting example based on the logical architecture illustrated in FIG. 1. FIG. 2 illustrates a mounting example of a geo-location database (GLDB) and a WSD. As illustrated in FIG. 2, the GLDB includes a database function, a geo-location function, and interface functions equivalent to communication units of the logical entities. A communication device (white space device: WSD) that performs communication using a frequency of television broadcast includes interface functions equivalent to communication units of the device control function and the device control function, as illustrated in FIG. 2.

Figure 3:
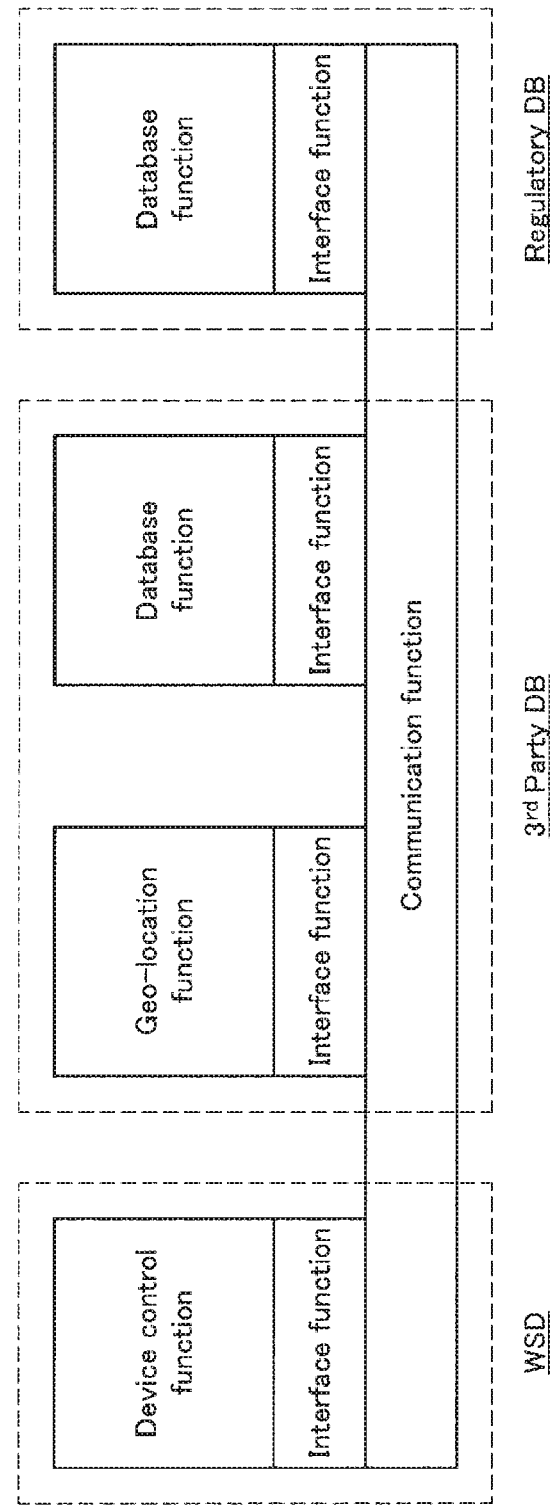
FIG. 3 is an explanatory diagram illustrating a mounting example based on the logical architecture illustrated in FIG. 1.

FIG. 3 is an explanatory diagram illustrating a mounting example based on the logical architecture illustrated in FIG. 1. FIG. 3 illustrates a mounting example of a network coexistence technology (IEEE 802.19.1) for a Britain TVWS system. As illustrated in FIG. 3, a TVWS database of a third party includes a database function and a geo-location function, and interface functions equivalent to communication units of the logical entities. A regulatory database includes a database function and an interface function equivalent to the communication unit of the database function. The white space device includes a device control function and an interface function equivalent to the communication unit of the device control function.

Figure 4:
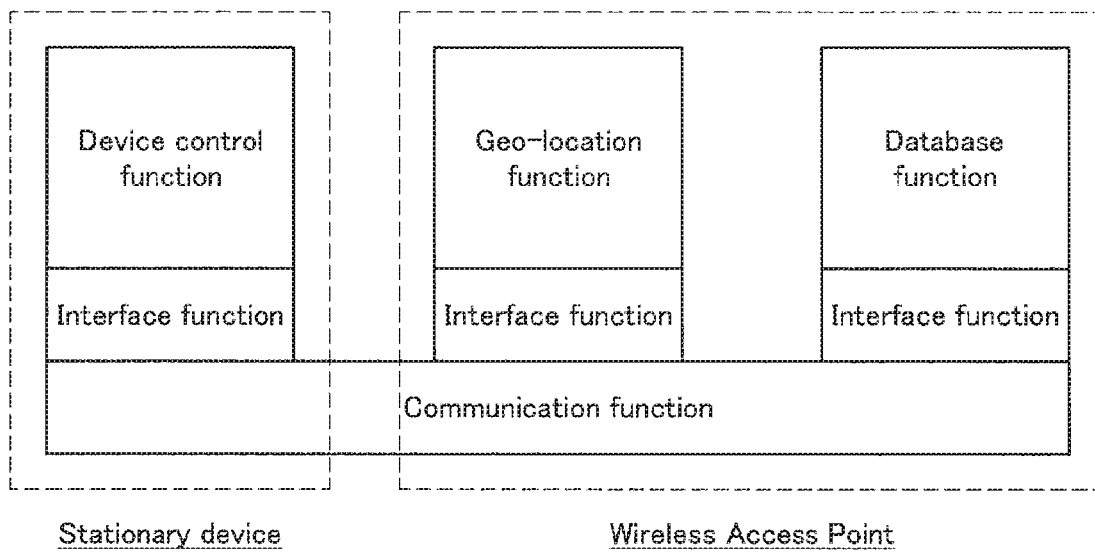
FIG. 4 is an explanatory diagram illustrating a mounting example based on the logical architecture illustrated in FIG. 1.

FIG. 4 is an explanatory diagram illustrating a mounting example based on the logical architecture illustrated in FIG. 1. FIG. 4 illustrates an example in which a wireless access point performs control of a stationary device and is equivalent to, for example, a relation between a base station and a user terminal of a cellular system. As illustrated in FIG. 4, the wireless access point includes a database function, a geo-location function, and interface functions equivalent to communication units of the logical entities. The stationary device includes a device control function and an interface function equivalent to a communication unit of the device control function.

Figure 5:
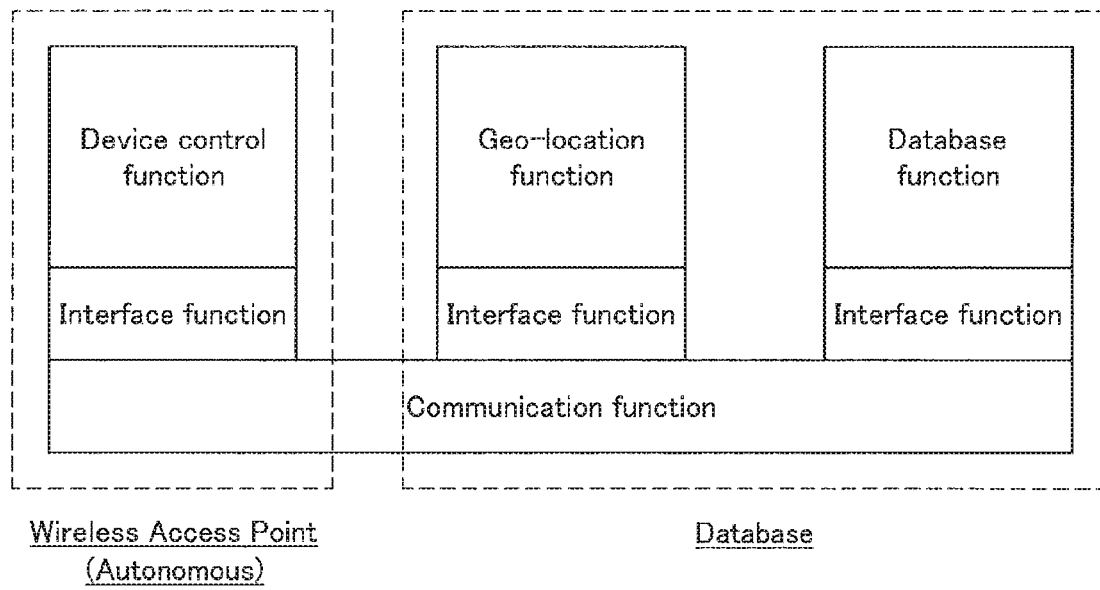
FIG. 5 is an explanatory diagram illustrating a mounting example based on the logical architecture illustrated in FIG. 1.

FIG. 5 is an explanatory diagram illustrating a mounting example based on the logical architecture illustrated in FIG. 1. FIG. 5 illustrates an example in which a self-distributed wireless access point acquires information from a database installed on a network, voluntarily calculates operation parameters of the wireless access point on the basis of the acquired information, and sets the operation parameters. As illustrated in FIG. 5, the (autonomous) wireless access point includes a device function, a geo-location function, and interface functions equivalent to communication units of the logical entities. The database includes a database function and an interface function equivalent to a communication unit of the database function.

Four mounting examples have been described above but mounting forms are not limited thereto. Any mounting form may be used as long as a modification or an application of the minimum configuration of the logical architecture illustrated in FIG. 1 is at least functionally embedded.

In the following description, an embodiment related to the geo-location function will be described. In addition, in the following description, a frequency sharing scenario in a TV frequency band will be assumed. As described in the foregoing embodiment, the present disclosure is actually not limited to the frequency sharing scenario in the TV frequency band.

The system model according to the embodiment of the present disclosure has been described above. Next, a configuration example of a communication control device according to the embodiment of the present disclosure will be described.

[1.3. Configuration Example]

Figure 6:
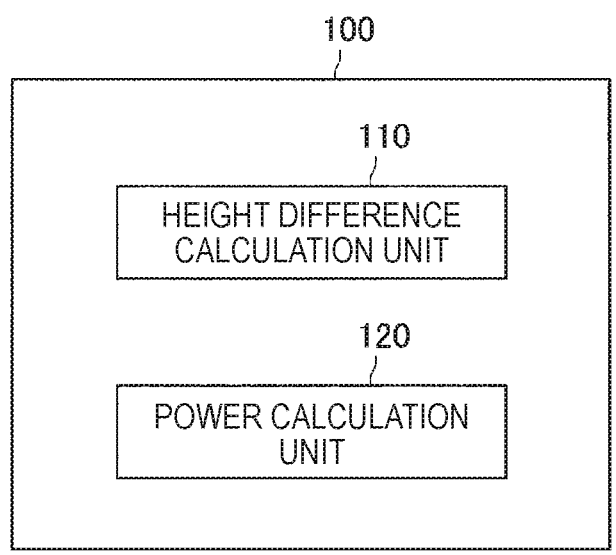
FIG. 6 is an explanatory diagram illustrating a configuration example of a communication control device according to the embodiment.

FIG. 6 is an explanatory diagram illustrating a configuration example of the communication control device according to the embodiment of the present disclosure. Hereinafter, the configuration example of the communication control device according to the embodiment of the present disclosure will be described with reference to FIG. 6.

As illustrated in FIG. 6, a communication control device 100 according to the embodiment of the present disclosure includes a height difference calculation unit 110 and a power calculation unit 120.

The height difference calculation unit 110 calculates a difference between an altitude of a reference point for calculating interference power including information regarding a height in a primary system and an altitude of a wireless communication device in a secondary system including a plurality of wireless communication devices sharing a frequency allocated to the primary system. A method in which the height difference calculation unit 110 calculates a difference in an altitude will be described in detail later.

The power calculation unit 120 calculates maximum allowable transmission power of the secondary system so that an allowable interference level of the primary system is satisfied, on the basis of whether the difference in the altitude calculated by the height difference calculation unit 110 satisfies a predetermined reference. Specifically, the power calculation unit 120 decides the maximum allowable transmission power of the secondary system so that an aggregate interference level by communication of an interference source that can occur at the reference point satisfies an allowable interference level of the primary system, using one or more wireless communication devices of the secondary systems for which the difference in the altitude calculated by the height difference calculation unit 110 is less than a predetermined value as the interference sources.

The communication control device 100 according to the embodiment of the present disclosure can be equivalent to, for example, the geo-location function in the logical architecture illustrated in FIG. 1.

Because the communication control device 100 according to the embodiment of the present disclosure has this configuration, it can calculate the maximum allowable transmission power simply and with a small calculation load by determining whether the WSD is an interference source on the basis of information regarding a height of the WSD and calculating the maximum allowable transmission power on the basis of the determination result.

A configuration example of the communication control device according to the embodiment of the present disclosure has been described above. Next, an operation example of the communication control device according to the embodiment of the present disclosure will be described.

[1.4. Operation Example]

Before an operation example of the communication control device according to the embodiment of the present disclosure is described, a method of calculating allowable transmission power on the basis of a path loss value calculated on the basis of a distance from the position of the reference point will be described as a method of calculating allowable transmission power based on positional information.

ECC Report 186 regulates the following calculation expression as a method of performing calculation on the basis of a path loss value calculated on the basis of a distance from the position of a reference point. The left side of the following expression is equivalent to a transmission power value of the communication device and the right side is equivalent to a calculation value of the maximum allowable transmission power of the communication device. In the expression, $m_{G\_dB}$ is a coupling gain (a path gain value to which an antenna gain or the like is added and a path loss value to which an antenna gain or the like is added at $-m_{G\_dB}$) between a reference point (the position of a television receiver or a wireless microphone in ECC Report 186) and a communication device.

$$P_{wsd\_tx\_dBm} \le m_{\hat{Z}\_dBm} - m_{G\_dB} - r_{wsd\_dB} - \sqrt{2}\,\text{erfc}^{-1}\!\left[2\!\left(1 - \frac{q_2}{q_1}\right)\right]\sqrt{\sigma_{\hat{Z}\_dB}^2 + \sigma_{G\_dB}^2} - IM_{dB} \quad \text{[Math. 1]}$$

$m_{\hat{Z}\_dBm}$: Minimum reception signal power serviced by primary system
$r_{wsd\_dB}$: Protection ratio, equivalent to predetermined SIR
$q_1$: Location probability serving as reference
$q_2$: Location probability after deterioration due to interference
$\sigma_{\hat{Z}\_dB}$: Standard deviation of $m_{\hat{Z}\_dBm}$
$\sigma_{G\_dB}$: Standard deviation of $m_{G\_dB}$
$IM_{dB}$: Interference margin As methods of calculating IM, three kinds of methods in which aggregate interference given from the plurality of WSDs to the primary system satisfies an allowable value are described. The three kinds of methods are fixed margin based calculation, flexible margin based calculation, and flexible minimized margin based calculation.

The present disclosure is not limited to these calculation methods. An important point when operation parameters of the WSD are calculated so that the aggregate interference given to the primary system by the plurality of WSDs satisfies the allowable value is which WSDs are considered for the calculation. Of course, the calculation may be performed in consideration of all the WSDs, but interference given to the primary system is ignorable in some cases depending on the positions of the WSDs. Thus, the consideration of the WSDs of which the interference is ignorable becomes a factor that increases a calculation load of the GLDB. In addition, in accordance with the foregoing calculation method, IM, that is, transmission power, is calculated on the basis of the number of WSDs. Therefore, adversely, the transmission power is excessively limited in the WSDs which do not contribute to the interference.

Accordingly, according to the embodiment, there is provided a method of calculating appropriate transmission power utilizing height information and geography information of a place at which the WSD is located.

Figure 7:
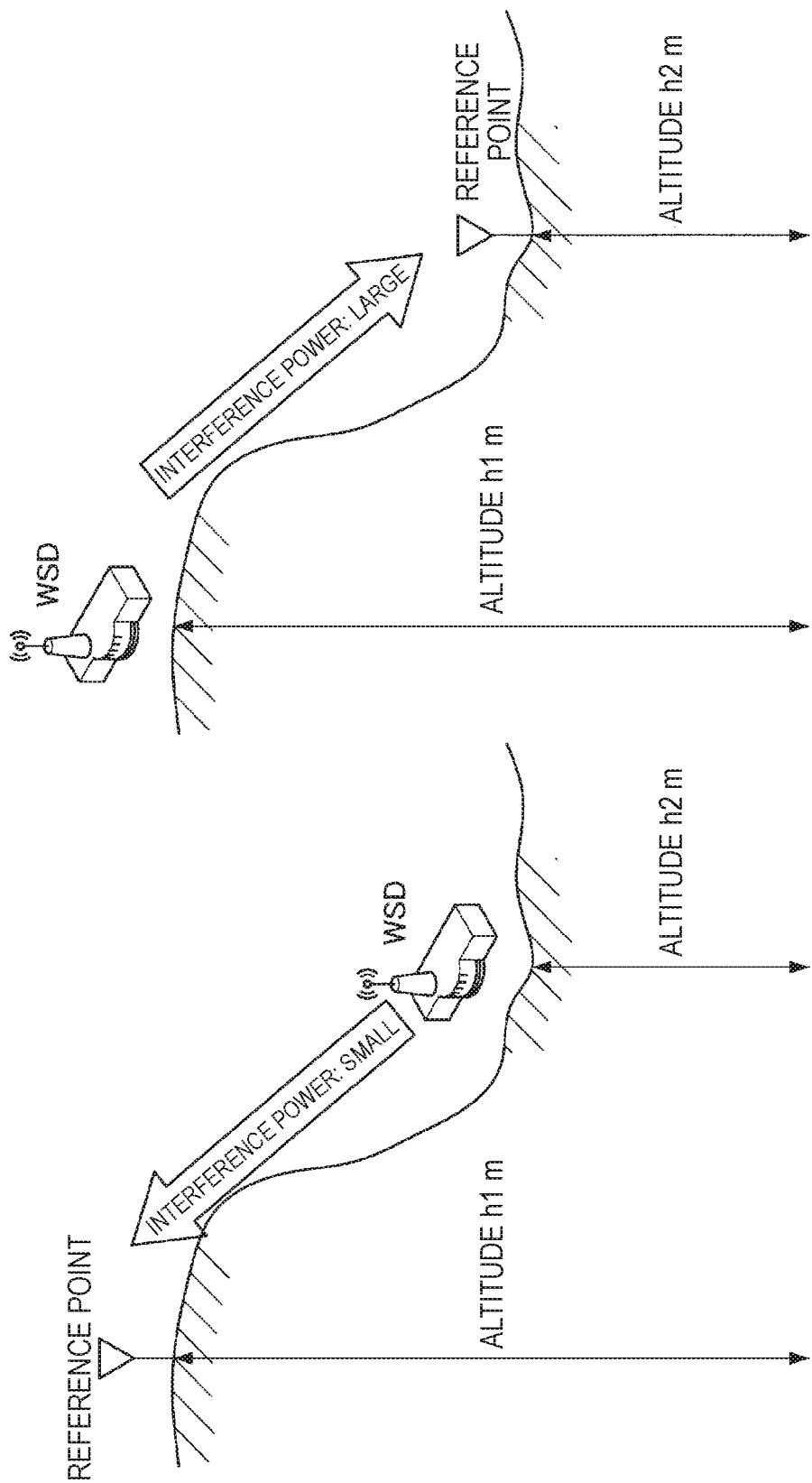
FIG. 7 is an explanatory diagram illustrating a difference in interference power in accordance with geography of a reference point and a WSD.

First, properties which are points of the embodiment will be described. FIG. 7 is an explanatory diagram illustrating a difference in interference power in accordance with geography of a reference point and a WSD. The reference point illustrated in FIG. 7 is, for example, the position of a primary system such as a wireless microphone in a frequency sharing scenario.

In the two examples of FIG. 7, a straight distance between the reference point and the WSD is the same, but a height relation differs due to geography. Thus, in the case of the left example in FIG. 7, interference given to the reference point by the WSD decreases. In the case of the right example, however, interference given to the reference point by the WSD increases. This is because, in a case in which a transmission spot is generally higher than a reception spot, interference easily occurs since radio waves have a property of easily flowing downward, and strong interference rarely occurs in the reverse case since radio waves have a property of not easily flowing upward. In addition, in a case in which the heights of the reference point and the WSD differ, there is a high possibility of the partner not being seen due to geography. In particular, in a case in which a transmission spot is lower than a reception point, it is conceived that stronger interference rarely occurs.

Accordingly, according to the embodiment, when transmission power control is performed in consideration of aggregate interference, a WSD is assumed to be considered for transmission power control performed in consideration of aggregate interference in a case in which it is determined that harmful interference is given to the reference point by the WSD due to geography and each ground height (altitude) in a positional relation between the reference point and the WSD. In a case in which it is determined that the harmful interference is not given to the reference point by the WSD, the WSD is assumed not to be considered for the transmission power control performed in consideration of the aggregate interference.

A specific operation example of the communication control device 100 according to the embodiment of the present disclosure will be described.

(1) Example of Determination by Comparing Heights of Two Spots

First, an example of determination by simply comparing heights of two spots of the reference point and the WSD will be described. As described above, in a case in which a transmission spot is generally higher than a reception spot, interference easily occurs since radio waves have a property of easily flowing downward, and strong interference rarely occurs in the reverse case since radio waves have a property of not easily flowing upward. Accordingly, the communication control device 100 may determines whether the WSD is considered for the transmission power control performed in consideration of the aggregate interference by, for example, the following expression. In the following expression, Δh is any margin value.

$$\text{if } h_{ReferencePoint} \leq h_{WSD} + \Delta h \quad \text{[Math. 2]}$$

WSD is considered for transmission power control else

WSD is not considered for transmission power control end

Figure 8:
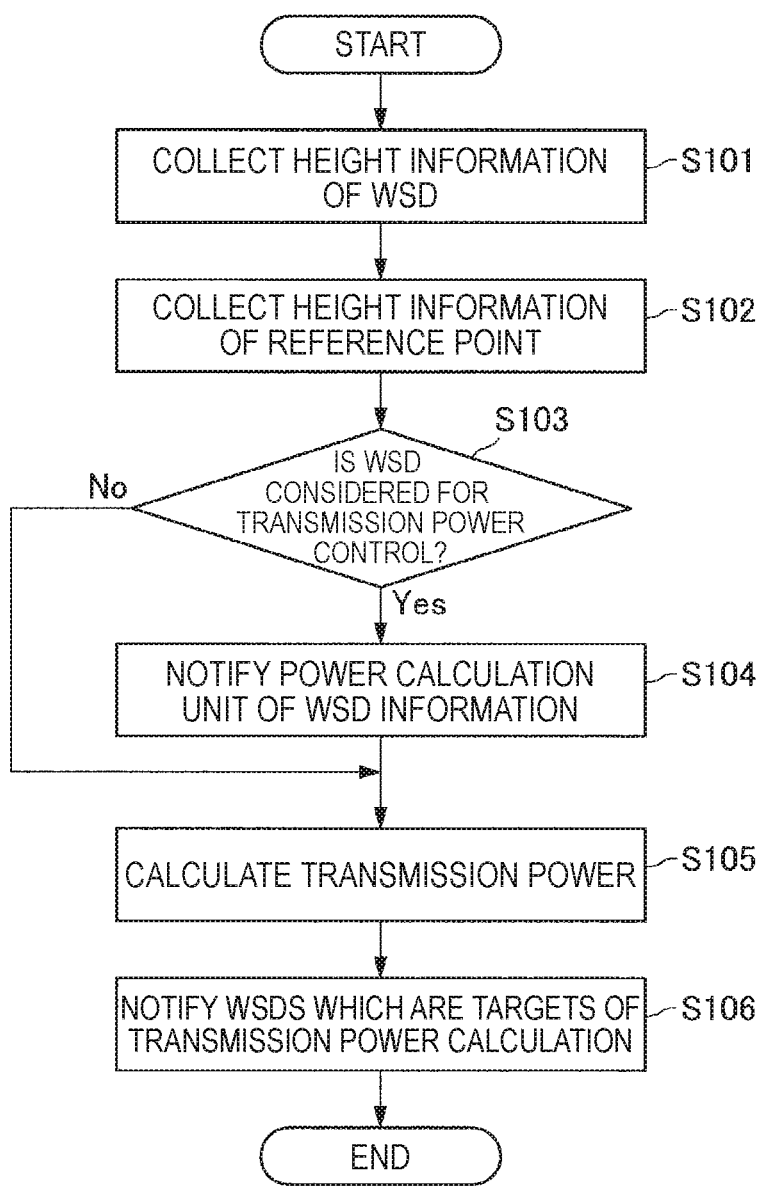
FIG. 8 is a flowchart illustrating an operation example of a communication control device 100 according to the embodiment.

FIG. 8 is a flowchart illustrating an operation example of a communication control device 100 according to the embodiment of the present disclosure. FIG. 8 illustrates an operation example of the communication control device 100 when it is determined whether or not harmful interference is given to the reference point by the WSD by comparing the heights of the two spots of the reference point and the WSD, and then the transmission power control is performed. Hereinafter, an operation example of the communication control device 100 according to the embodiment of the present disclosure will be described with reference to FIG. 8.

When the transmission power control is performed, the communication control device 100 first collects height information (altitude) of the WSD (step S101) and subsequently collects height information (altitude) of the reference point (step S102). The collection of the height information in steps S101 and S102 is performed by, for example, the height difference calculation unit 110. Note that the execution order of steps S101 and S102 may be reverse.

Note that the height information of the WSD may be notified of by the WSD or information stored in the database function may be used. For the reference point of the transmission power calculation, the height information may be acquired from the regulatory database when the reference point is a wireless microphone or the like. In addition, when a specific position is designated as the reference point, the specific position may be used.

When the height information of the WSD and the reference point is collected, the communication control device 100 subsequently determines whether the WSD of which the height information is collected in step S101 is considered for the transmission power control on the basis of the collected height information (step S103). This determination may be performed by the power calculation unit 120 on the basis of a difference between the altitudes of the WSD and the reference point calculated by the height difference calculation unit 110 or may be performed by the height difference calculation unit 110 on the basis of the difference between the altitudes of the WSD and the reference point calculated by the height difference calculation unit 110.

The communication control device 100 uses the above-described determination expression at the time of the determination of step S103. In a case in which it is determined as the result of the determination of step S103 that the WSD of which the height information is collected in step S101 is considered for the transmission power control (Yes in step S103), the communication control device 100 sends information regarding the WSD to the power calculation unit 120 (for example, the geo-location function) (step S104). In a case in which it is determined as the result of the determination of step S103 that the WSD of which the height information is collected in step S101 is not considered for the transmission power control (No in step S103), the communication control device 100 skips the process of step S104.

Regardless of whether the WSD of which the height information is collected is considered for the transmission power control, the power calculation unit 120 calculates the maximum allowable transmission power of the secondary system at any timing (step S105). Then, the communication control device 100 notifies all the WSDs which are targets of the transmission power control of a calculation result (step S106). The calculation result may be notified of in accordance with any method. In addition, the communication control device 100 may notify of information regarding the transmission power itself or may notify of information obtained by processing the information regarding the transmission power.

The communication control device 100 according to the embodiment of the present disclosure can determine whether the WSD is an interference source on the basis of the height information of the WSD by performing the above-described series of operations and can calculate the maximum allowable transmission power simply and with a small calculation load by calculating the maximum allowable transmission power on the basis of the determination result.

Next, an application example of the example in which the determination is performed by comparing the heights of two spots will be described. ETSI EN 301 598 regulates an operation mode in which a slave WSD connected to a master WSD to perform communication can operate without including a positioning function as in Global Navigation Satellite System (GNSS) (which is called a generic operation). Accordingly, it is considerably difficult to perform the transmission power control performed in consideration of aggregate interference in addition to the slave WSD of the generic operation.

Accordingly, in the embodiment, the transmission power control performed in consideration of the aggregate interference is enabled in addition the slave WSD of the generic operation in accordance with the following methods.

A first method is a method of causing the geo-location function to recognize the number of slave WSDs (the number of slave WSDs per master WSD). This may be performed in any way. For example, the master WSD may count the number of serving slave WSDs and notify the geo-location function of the number of counted slave WSDs. Alternatively, for example, when information regarding the slave WSDs is recorded in the database function, the master WSD may count the number of slave WSDs on the basis of the information. In addition, the number of slave WSDs may be counted for each frequency channel. In addition, for example, in a case in which a channel different from a frequency channel at which aggregate interference can occur is used at the reference point, the master WSD may set a coefficient in accordance with a separation width of the channel and set a number processed in accordance with the coefficient as the number of slave WSDs. That is, the number of slave WSDs may be any number by which contribution to the calculation of the interference is possible. Then, the communication control device 100 uses the number of finally recognized slave WSDs for the transmission power control performed in consideration of the aggregate interference. At this time, the transmission power control is the fixed margin method or the flexible margin method.

A second method is a method of determining whether a slave WSD is considered for the aggregate interference in accordance with the altitude of the serving maser WSD. It is conceived that most of the slave WSD are near the serving master WSD. Therefore, when there is information regarding the altitude of the master WSD, this information can be used although positional information or height information of the slave WSDs may not acquired. In a case in which this method is adopted, the above-described determination expression is modified as follows.

$$\text{if } h_{ReferencePoint} \leq h_{MasterWSD} + \Delta h \quad \text{[Math. 3]}$$

Master WSD and Slave WSDs communicating with Master WSD are considered for transmission power control
else
Master WSD and Slave WSDs communicating with Master WSD are not considered for transmission power control
end By changing the determination expression in this way, the communication control device 100 can also consider the slave WSDs served by the maser WSD for the transmission power control when the master WSD satisfies a condition even when slave WSD may not acquire the positional information or the height information.

(2) Example of Determination in Consideration of Geography in Section Binding Two Points The example in which it is determined whether the WSD is considered for the transmission power control by comparing the heights of two spots of the reference point and the WSD has been described, but a case which is not effective in the method is also conceivable.

Figure 9:
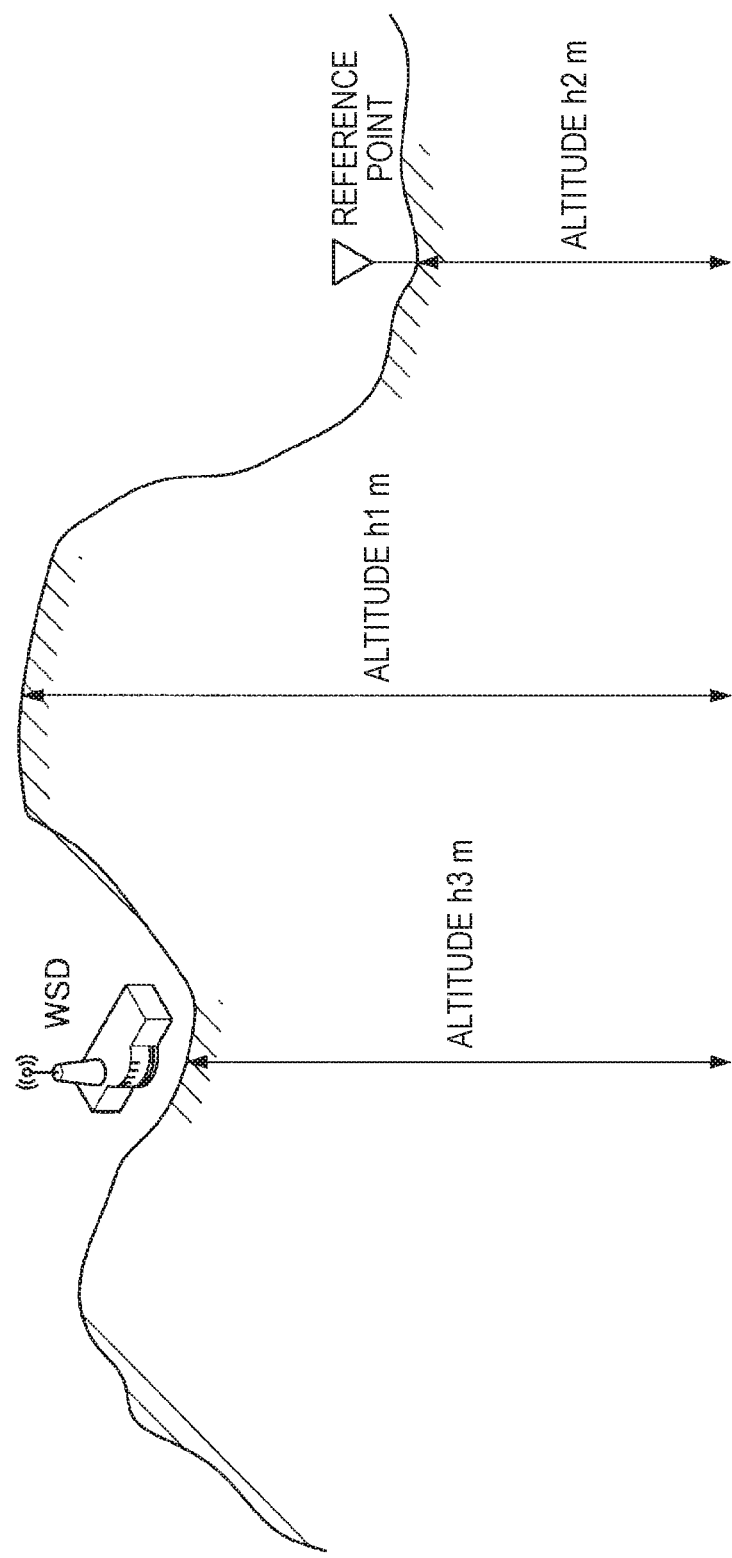
FIG. 9 is an explanatory diagram illustrating an example of a positional relation between two spots of the reference point and the WSD.

FIG. 9 is an explanatory diagram illustrating an example of a positional relation between two spots of the reference point and the WSD. As in the example illustrated in FIG. 9, a case in which a small hill is between the reference point and the WSD is conceived. In a method of comparing the heights of the two spots of the reference point and the WSD, the WSD illustrated in FIG. 9 can be an interference source at the reference point. Actually, however, since a small hill is between the reference point and the WSD, the reference point may not be seen from a place at which the WSD is located. Therefore, in the method of comparing the heights of the two spots of the reference point and the WSD, the WSD for which there is a considerably small possibility of being actually an interference source may be considered for the transmission power control.

On the other hand, from the viewpoint of a calculation load or the like, it is not practical to completely ascertain the geography of a path between the WSD and the reference point and determine the transmission power control. Accordingly, the communication control device 100 according to the embodiment approximately ascertains the path between the WSD and the reference point as follows.

For example, the communication control device 100 voluntarily divides a map into divisions. A division method is not limited to a specific pattern. For example, in Britain, the communication control device 100 may use Ordnance Survey National Grid (OSNG). In addition, for example, the communication control device 100 may use a division unit such as an address decided in advance administratively.

The communication control device 100 sets height information for each division when the map is divided into any division. The height information may be any of an average value, a maximum value, and a minimum value of altitudes in each division. In this case, the height information is preferably the maximum value of the altitude in each division. In a case in which there is a construction such as a building in each division, the communication control device 100 may set the height information using the height of the construction. Note that when there is information regarding heights decided in advance administratively, the communication control device 100 may set the height information using the information. In addition, when there is reliable data opened by any organization regardless of being public or private, the communication control device 100 may set the height information using the information. In addition, in a case in which clutter data can be used, as in UK Planning Model (see http://downloads.bbc.co.uk/rd/pubs/whp/whp-pdf-files/WHP048.pdf), the communication control device 100 may consider a reference height decided for each cluster class.

FIG. 10 is an explanatory diagram illustrating a setting example of height information in each division in a divided map.

In addition, the communication control device 100 maps each of the WSD and the reference point to the divided map and acquires height information set in the division. Further, the communication control device 100 acquires height information in the division which is between the WSD and the reference point.

In this way, when the communication control device 100 acquires height information set in the divisions in which the WSD and the reference point are each located and height information in the division which is between the WSD and the reference point, the communication control device 100 determines whether the WSD is an interference source on the basis of the height information.

For example, when the height of the division which is between the WSD and the reference point is higher than the height of one of the WSD and the reference point by any value or more, the communication control device 100 does not consider the WSD for the transmission power control and considers the WSD otherwise.

In addition, the height of the division which is between the WSD and the reference point is higher than the height of one of the WSD and the reference point by any value or less, but when a straight distance is any value or more, the communication control device 100 does not consider the WSD for the transmission power control and considers the WSD otherwise.

FIG. 11 is an explanatory diagram illustrating an example of a method of comparing heights of the WSD and the reference points. For example, in a case in which the reference point and the WSD are located as in FIG. 11, the communication control device 100 acquires height information of divisions indicated by reference numerals r11 and r12 in FIG. 11. Then, when the heights of the divisions indicated by reference numerals r11 and r12 are higher than the height of one of the WSD and the reference point by any value or more, the communication control device 100 does not consider the WSD for the transmission power control and considers the WSD otherwise. In addition, the heights of the divisions indicated by reference numerals r11 and r12 are equal to r less than the height of one of the WSD and the reference point by any value or less, but when a straight distance is any value or more, the communication control device 100 does not consider the WSD for the transmission power control and considers the WSD otherwise.

In the case of the example illustrated in FIG. 11, the communication control device 100 passes over the plurality of divisions to be considered. In this case, the communication control device 100 may perform determination with reference to only the height of any one division and may refer to the heights of all the divisions to be considered. In a case in which the communication control device 100 performs the determination with reference only the height of any one division, the communication control device 100 may select the highest height in all the divisions to be considered.

2. CONCLUSION

According to the embodiment of the present disclosure, as described above, there is provided the communication control device 100 that performs the transmission power control of the WSDs using the altitude of the WSD and the altitude of the reference point. The communication control device 100 according to the embodiment of the present disclosure can calculate the maximum allowable transmission power simply and with a small calculation load by performing the transmission power control of the WSDs using the altitude of the WSD and the altitude of the reference point.

A computer program for causing hardware such as a CPU, a ROM, and a RAM that is incorporated in each apparatus, to execute a function equivalent to the above-described configuration of each apparatus can also be created. In addition, a storage medium storing the computer program can also be provided. In addition, by forming each functional block illustrated in a functional block diagram, by hardware or a hardware circuit, a series of processes can also be implemented by hardware or a hardware circuit.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A communication control device including:

a height difference calculation unit configured to calculate a difference between an altitude of a reference point for calculating interference power including information regarding a height in a first wireless system and an altitude of one wireless communication device in a second wireless system including a plurality of wireless communication devices sharing a frequency allocated to the first wireless system; and a power calculation unit configured to decide maximum allowable transmission power of the second wireless system so that an aggregate interference level due to communication of an interference source that can occur at the reference point satisfies an allowable interference level of the first wireless system, using one or more of the wireless communication devices for which the difference is less than a predetermined value as the interference source.

(2)

The communication control device according to (1), in which the second wireless system includes a master wireless communication device and a slave wireless communication device connected to the master wireless communication device.

(3)

The communication control device according to (2), in which the height difference calculation unit calculates a difference between the altitude of the reference point and an altitude of the master wireless communication device.

(4)

The communication control device according to (3), in which the power calculation unit sets the master wireless communication device and the slave wireless communication device as interference sources in a case in which the difference is less than a predetermined value.

(5)

The communication control device according to any one of (1) to (4), in which the height difference calculation unit calculates a difference between a first altitude and a second altitude of a first geographic region and a second geographic region, respectively, in which one of the wireless communication devices is located, and the power calculation unit sets the wireless communication device for which the difference is less than a predetermined value as an interference source.

(6)

The communication control device according to (5), in which the power calculation unit further determines whether to set the wireless communication device for which the difference is less than a predetermined value as the interference source, using information regarding an altitude of a geographic region between the first geographic region and the second geographic region.

(7)

The communication control device according to (5), in which the power calculation unit further determines whether to set the wireless communication device for which the difference is less than a predetermined value as the interference source, using information regarding a distance between the reference point and one of the wireless communication devices.

(8)

A communication control method including:

calculating a difference between an altitude of a reference point for calculating interference power including information regarding a height in a first wireless system and an altitude of one wireless communication device in a second wireless system including a plurality of wireless communication devices sharing a frequency allocated to the first wireless system; and deciding maximum allowable transmission power of the second wireless system so that an aggregate interference level due to communication of an interference source that can occur at the reference point satisfies an allowable interference level of the first wireless system, using one or more of the wireless communication devices for which the difference is less than a predetermined value as the interference source.

(9)

A computer program causing a computer to perform:

calculating a difference between an altitude of a reference point for calculating interference power including information regarding a height in a first wireless system and an altitude of one wireless communication device in a second wireless system including a plurality of wireless communication devices sharing a frequency allocated to the first wireless system; and deciding maximum allowable transmission power of the second wireless system so that an aggregate interference level due to communication of an interference source that can occur at the reference point satisfies an allowable interference level of the first wireless system, using one or more of the wireless communication devices for which the difference is less than a predetermined value as the interference source.

REFERENCE SIGNS LIST 100 communication control device

The invention claimed is:

1. A communication control device, comprising:
a central processing unit (CPU) configured to:
acquire height information of a reference point, wherein
the height information indicates an altitude of the reference point, and
the reference point is associated with a first wireless system;
acquire an altitude of at least one wireless communication device of a plurality of wireless communication devices in a second wireless system;
calculate a first difference between the altitude of the reference point and the altitude of the at least one wireless communication device, wherein
the plurality of wireless communication devices shares a frequency allocated to the first wireless system; and
determine maximum allowable transmission power of the second wireless system such that an aggregate interference level at the reference point satisfies an allowable interference level of the first wireless system, wherein
the aggregate interference level is based on communication of an interference source,
the maximum allowable transmission power of the second wireless system is determined based on the at least one wireless communication device for which the calculated first difference is less than a first value, and
the at least one wireless communication device corresponds to the interference source.

2. The communication control device according to claim 1, wherein
the second wireless system includes a master wireless communication device of the plurality of wireless communication devices and a slave wireless communication device of the plurality of wireless communication devices, and
the slave wireless communication device is connected to the master wireless communication device.

3. The communication control device according to claim 2, wherein the CPU is further configured to calculate a second difference between the altitude of the reference point and an altitude of the master wireless communication device.

4. The communication control device according to claim 3, wherein the CPU is further configured to set the master wireless communication device and the slave wireless communication device as interference sources, based on the calculated second difference that is less than a second value.

5. The communication control device according to claim 1, wherein the CPU is further configured to:
calculate a second difference between an altitude of a first geographic region and an altitude of a second geographic region, wherein
a specific wireless communication device of the plurality of wireless communication devices is in one of the first geographic region or the second geographic region; and
set the specific wireless communication device as the interference source based on the calculated second difference that is less than a second value.

6. The communication control device according to claim 5, wherein the CPU is further configured to set the specific wireless communication device as the interference source based on information regarding an altitude of a third geographic region that is between the first geographic region and the second geographic region.

7. The communication control device according to claim 5, wherein the CPU is further configured to set the specific wireless communication device as the interference source based on information regarding a distance between the reference point and the specific wireless communication device.

8. A communication control method, comprising:
acquiring height information of a reference point, wherein
the height information indicates an altitude of the reference point, and
the reference point is associated with a first wireless system;
acquiring an altitude of at least one wireless communication device of a plurality of wireless communication devices in a second wireless system;
calculating a difference between the altitude of the reference point and the altitude of the at least one wireless communication device, wherein
the plurality of wireless communication devices shares a frequency allocated to the first wireless system; and
determining maximum allowable transmission power of the second wireless system such that an aggregate interference level at the reference point satisfies an allowable interference level of the first wireless system, wherein
the aggregate interference level is based on communication of an interference source,
the maximum allowable transmission power of the second wireless system is determined based on the at least one wireless communication device for which the calculated difference is less than a specific value, and
the at least one wireless communication device corresponds to the interference source.

9. A non-transitory computer-readable medium having stored thereon computer-executable instructions that, when executed by a processor, cause the processor to execute operations, the operations comprising:
acquiring height information of a reference point, wherein
the height information indicates an altitude of the reference point, and
the reference point is associated with a first wireless system;

acquiring an altitude of at least one wireless communication device of a plurality of wireless communication devices in a second wireless system;
calculating a difference between the altitude of the reference point and the altitude of the at least one wireless communication device, wherein
the plurality of wireless communication devices shares a frequency allocated to the first wireless system; and
determining maximum allowable transmission power of the second wireless system such that an aggregate interference level at the reference point satisfies an allowable interference level of the first wireless system, wherein
the aggregate interference level is based on communication of an interference source,
the maximum allowable transmission power of the second wireless system is determined based on the at least one wireless communication device for which the calculated difference is less than a specific value, and
the at least one wireless communication device corresponds to the interference source.

\* \* \* \* \*